United States Patent Office 2,953,905
Patented Sept. 27, 1960

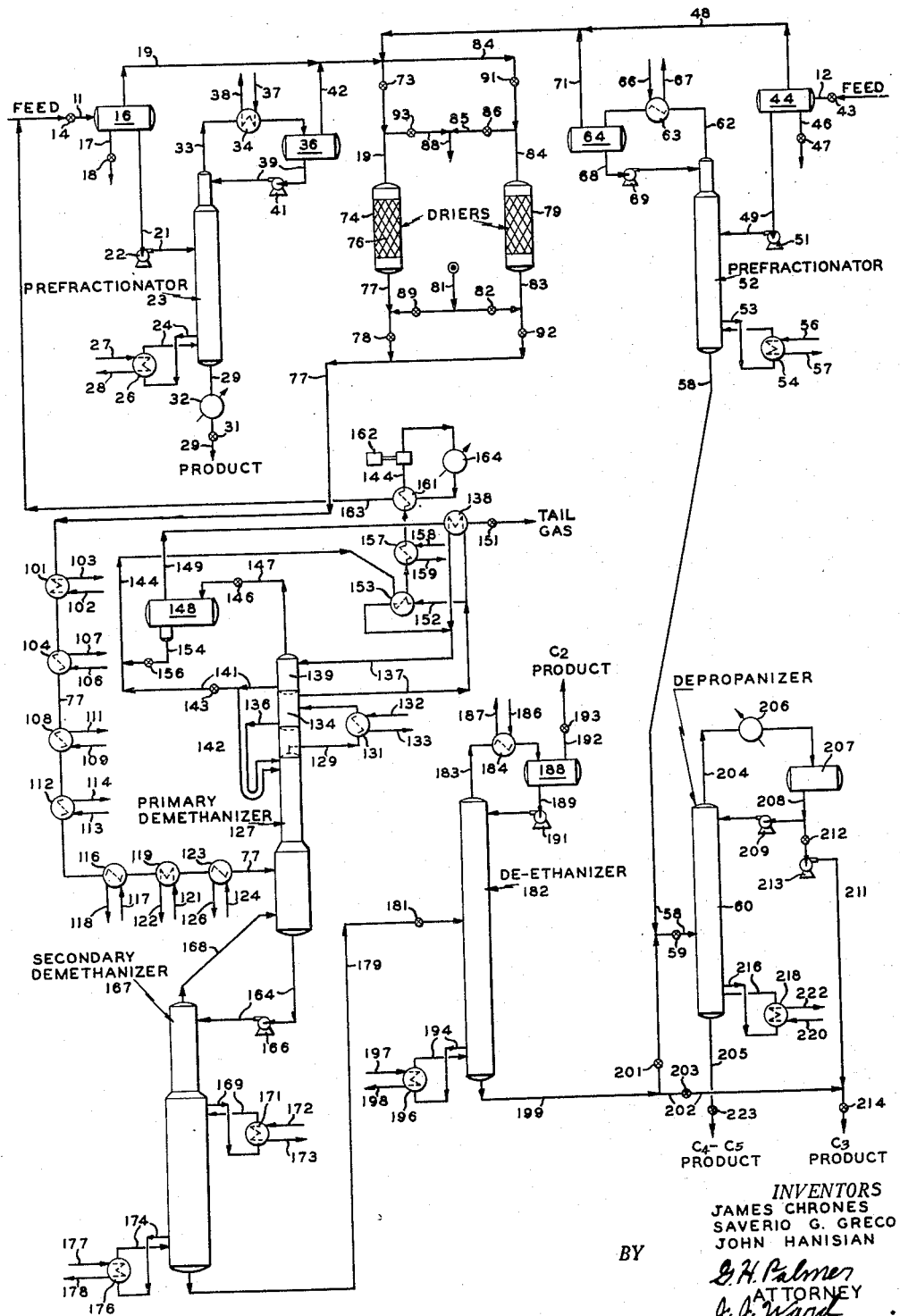

2,953,905

HYDROCARBON SEPARATION

James Chrones, Scotch Plains, N.J., and Saverio G. Greco, Brooklyn, and John Hanisian, Westbury, N.Y., assignors to The M. W. Kellogg Company, Jersey City, N.J., a corporation of Delaware Filed Mar. 15, 1957, Ser. No. 646,269

4 Claims. (Cl. 62—28)

This invention relates to an improved process for the separation of hydrocarbons. This invention also relates to an improved process for the separation of $C_2$ and/or $C_3$ hydrocarbons from mixtures containing the same.

This invention is useful generally in situations wherein it is desired to recover $C_3$ hydrocarbons from mixtures containing $C_2$, $C_3$ and $C_4$ hydrocarbons. It is also useful where it is desired to recover $C_2$ or $C_4$ hydrocarbons from such mixtures. In addition, if such a mixture contains water or water vapor, this invention is useful where it is desired to recover one or more of the hydrocarbon fractions relatively free of water.

Many processes for the treatment of hydrocarbons, such as, catalytic reforming or pyrolytic conversion processes result in the formation of a product containing $C_2$, $C_3$ and $C_4$ hydrocarbons as well as water. Such a product is formed, for example, as the result of the pyrolytic conversion of hydrocarbons to produce ethylene. Such products may contain components other than the ones mentioned, such as methane, $C_5$ and heavier hydrocarbons, carbon dioxide or sulfur compounds. It is frequently desired to recover $C_2$, $C_3$ or $C_4$ compounds from such product mixtures and it is usually desirable to recover such fractions relatively free of sulfur compounds. It has been customary to remove sulfur compounds by scrubbing the product with an aqueous solution of a suitable sulfur removing agent such as sodium hydroxide, drying the product and then processing the product for separation of the desired hydrocarbon fractions. One disadvantage of this method is that it is necessary to subject the entire product to both the sulfur removal and drying steps. Another disadvantages of this method is that the sulfur and more unsaturated hydrocarbons are more readily absorbed in the desiccants commonly used for drying than are the lighter and more saturated hydrocarbons. This results in reduction of drying efficiency and shortening of the useful life of the desiccant as well as undue polymerization of the hydrocarbons.

It is an object of this invention to provide an improved process for the fractionation of hydrocarbon fractions.

It is another object of this invention to provide an improved process for the production of ethylene.

Another object of this invention is to provide an improved process for recovering fractions comprising $C_2$ or $C_3$ hydrocarbons from mixtures containing $C_2$, $C_3$ and $C_4$ hydrocarbons.

A further object of this invention is to provide an improved process for the production of ethylene in which an ethylene-containing product is fractionated into fractions comprising $C_2$, $C_3$ and $C_4$ hydrocarbons and in which one or more of these fractions is obtained free of water.

This invention provides a process for the separation of hydrocarbons from a mixture containing $C_2$, $C_3$ and $C_4$ hydrocarbons in which the mixture is fractionated in a first distillation zone. A bottoms fraction comprising $C_3$ and $C_4$ hydrocarbons is withdrawn from the first distillation zone and passed to a second distillation zone. An overhead fraction comprising $C_2$, $C_3$ and $C_4$ hydrocarbons is also withdrawn from the first distillation zone and is treated for the removal of $C_2$ hydrocarbons. In the second distillation zone, the bottoms from the first distillation zone are fractionated to produce an overhead fraction rich in $C_3$ hydrocarbons and a bottoms fraction rich in $C_4$ hydrocarbons and the overhead and bottoms fractions thus produced are withdrawn from the second distillation zone. The overhead fraction withdrawn from the second distillation zone preferably comprises essentially $C_3$ hydrocarbons.

If the mixture being treated in accordance with this invention contains methane, the methane will pass with the overhead from the first distillation zone and will either be removed with the $C_2$ hydrocarbons or may be separately removed. If the mixture being treated according to this invention contains $C_5$ hydrocarbons or sulfur, these will be withdrawn as part of the bottoms fraction from the first distillation zone and will be included in the $C_4$-rich fraction which is withdrawn as bottoms from the second distillation zone. Any other components present in the mixture originally may be removed as desired without departing from the scope of this invention. If desired, any of the fractions removed or withdrawn in accordance with this invention may be further treated for recovery of specific components therefrom. For example, the $C_2$ hydrocarbons may be treated for the separation and recovery of ethane and/or ethylene and other fractions may be similarly treated.

The overhead fraction from the first distillation zone frequently contains both $C_1$ and $C_2$ hydrocarbons as well as $C_3$ and $C_4$ hydrocarbons. In such instances it is usually desirable to remove the $C_1$ and $C_2$ hydrocarbons separately by fractional distillation or by other suitable means such as absorption. The $C_2$ fraction may then be further fractionated to separate ethylene from ethane.

According to one aspect of this invention, the overhead fraction from the first distillation zone from which the $C_2$ hydrocarbons have been removed is combined with the overhead from the second distillation zone to form a product rich in $C_3$ hydrocarbons. In this aspect of the present invention, $C_1$ and $C_2$ hydrocarbons present in the overhead from the first distillation zone are preferably substantially removed prior to combining the overhead fraction from the first distillation zone with that from the second distillation zone. This aspect of the present invention is especially useful when the overhead from the first distillation zone contains less than about 5 percent $C_4$ and heavier hydrocarbons after removal of substantially all $C_1$ and $C_2$ hydrocarbons as described above.

According to another aspect of this invention, the overhead from the first distillation zone which has been treated for removal of $C_2$ hydrocarbons is passed to the second distillation zone. In this way, the second distillation zone serves to remove $C_4$ and heavier hydrocarbons from the overhead from the first distillation zone. As a result, the overhead from the second distillation zone provides a $C_3$ product fraction which contains a higher proportion of $C_3$ hydrocarbons than it would if it were formed by combining overhead of the first distillation zone from which $C_2$ hydrocarbons have been removed with overhead from the second distillation zone as described above. In this aspect of the present invention, methane and $C_2$ hydrocarbons are preferably removed substantially from the overhead of the first distillation zone before said overhead is passed to the second distillation zone. This aspect of our invention is especially useful where the overhead of the first distillation zone contains more than about 5 percent $C_4$ and heavier hydrocarbons after removal of substantially all $C_1$ and $C_2$ hydrocarbons as described above.

This invention provides an improved means of recovering the various hydrocarbon fractions free of water. Water may be present in the gaseous mixture treated according to this invention as a result of the use of steam in the conversion process from which the mixture is obtained or water may, for instance, be used in a quenching or scrubbing step during the treatment of such mixture. If the original mixture contains sulfur compounds, an aqueous solution of a suitable absorbent may be used to remove such sulfur compounds from the mixture being treated and the mixture may contain entrained water vapor from such an absorption step. In any event, it is necessary to subject the mixture to treatment for the removal of any water present in order to prevent the formation of hydrates or ice when the mixture is fractionated at suitable conditions for the removal of the lighter hydrocarbon components e.g. methane or $C_2$ hydrocarbons. By the use of this invention it is not necessary to treat the entire product mixture for the removal of water. Due to the operating conditions maintained in the first distillation zone, any water present passes with the overhead from the first distillation zone and it is therefore unnecessary to treat the bottoms from the first distillation zone for the removal of water. This, of course, results in economy of operation in the drying step. Also, since $C_4$ and heavier hydrocarbons and a portion of the $C_3$ hydrocarbons are removed from the mixture prior to the drying step, the undesirable effects of absorption or polymerization of these components from the drying step are avoided.

This invention is particularly suitable for the treatment of mixtures obtained as the result of pyrolytic conversion of hydrocarbons to produce ethylene. Such mixtures frequently contain $C_2$, $C_3$ and $C_4$ hydrocarbons as well as sulfur, methane and sulfur compounds such as $H_2S$. These mixtures also frequently contain water. In accordance with a preferred embodiment of this invention, such mixtures are treated for the removal of sulfur compounds and the remaining mixture is then treated in accordance with this invention. Any heavy hydrocarbons present, e.g. $C_6$ or heavier hydrocarbons are preferably removed prior to treating the mixture in accordance with this invention but such hydrocarbons may be allowed to remain in the mixture and if desired, may then be removed subsequently from the bottoms fraction withdrawn from the second distillation zone. Any water present in the mixture will pass with the overhead from the first distillation zone and may be removed prior to treating the overhead for separation of $C_1$ or $C_2$ hydrocarbon fractions.

Any suitable means may be used to dry the overhead fraction from the first distillation zone. For example, the wet fraction may be dryed by combining it with a desiccant such as calcium chloride, silica gel or alumina. When the desiccant has absorbed sufficient water so that its efficiency is affected. It can usually be regenerated by passing hot dry gas through it to remove the absorbed water or the water can be removed by other suitable means. Regeneration of the desiccant can be accomplished without interfering with a continuous process if two or more beds of desiccant are provided so that one can be on stream while one or more are being regenerated. Alternatively, the desiccant itself can be passed in a continuous cycle of absorption and regeneration.

The various steps of this invention may be practiced under any suitable conditions of temperature and pressure. The temperature at which the bottoms fraction is withdrawn from the first distillation zone is preferably maintained sufficiently high so that no hydrates are formed in the first distillation zone and any water present is withdrawn with the overhead fraction. If this is done it is unnecessary to treat the bottoms fraction from the first distillation zone for removal of water.

In a preferred embodiment of this invention the pressure in the first distillation zone is maintained between about 500 and about 550 p.s.i.g. while the pressure in the second distillation zone is maintained between 200 and about 250 p.s.i.g. If the preferred pressures are used, the first distillation zone is preferably maintained at a bottom temperature between about 225 and about 275° F. and top temperature between 90 and about 130° F. while the second zone is preferably maintained at a bottom temperature between about 180 and between about 240 and a top temperature of between about 90 and about 130° F. Other suitable temperatures and pressures may, of course, be used without departing from the scope of this invention.

For a better understanding of this invention, reference should be had to the accompanying drawing which is a diagrammatic illustration in elevation of a suitable arrangement of apparatus for carrying out a preferred embodiment of this invention.

In the drawing, feed gas enters the process through conduits 11 and 12. The feed entering through conduit 11 is refinery gas obtained as a product or by product of various refinery processes, such as thermal cracking and also includes a recycle stream introduced through conduit 163 as described below. The feed entering through conduit 12 has been obtained as the product or by-product of various refining and conversion processes, such as catalytic cracking units. The feed entering through conduits 11 and 12 has been treated for removal of sulfur compounds by scrubbing with an aqueous solution of sodium hydroxide and the caustic has been removed by a water wash. The composition of the feed entering through conduit 11 is shown in Table I and the composition of the feed entering through conduit 12 is shown in Table II.

TABLE I

*Composition of feed in conduit 11*

| Component: | Lb./hr. |
|---|---|
| Inerts ($N_2$, CO, $O_2$) | 515 |
| $H_2$ | 252 |
| $C_1$ hydrocarbons | 4,924 |
| $C_2$ hydrocarbons | 9,829 |
| $C_3$ hydrocarbons | 18,065 |
| $C_4$ hydrocarbons | 15,046 |
| $C_5$ hydrocarbons | 3,337 |
| $C_6$ and heavier hydrocarbons | 500 |
| $H_2O$ | 171 |
| Total | 52,639 |

TABLE II

*Composition of feed in conduit 12*

| Component: | Lb./hr. |
|---|---|
| Inerts | 11,598 |
| $H_2$ | 1,688 |
| $C_1$ hydrocarbons | 15,956 |
| $C_2$ hydrocarbons | 32,530 |
| $C_3$ hydrocarbons | 38,420 |
| $C_4$ hydrocarbons | 16,550 |
| $C_5$ hydrocarbons | 3,130 |
| $C_6$ and heavier hydrocarbons | 1,080 |
| $H_2O$ | 144 |
| Total | 121,096 |

The feed entering through conduit 11 passes through a valve 14 into a separation drum 16 which is maintained at a temperature of 70° F. and a pressure of 530 p.s.i.g. Feed enters through conduit 11 at the rate of 52,639 pounds per hour. Water separated in separation drum 16 is withdrawn through conduit 17 and a valve 18 at the rate of 162 pounds per hour. Vapors from separation drum 16 are withdrawn through conduit 19 at the rate of 15,634 pounds per hour, while liquid from separation drum 16 is withdrawn through conduit 21 at the rate of 36,843 pounds per hour. Liquid in conduit 21 is passed via a pump 22 to a prefractionator 23 which is a conventional distillation tower. Prefractionator 23 is maintained at a bottom pressure of 535 p.s.i.g. with a bottom temperature of 250° F. and a top temperature of 110° F. Liquid from the lower portion of prefractionator 23 is withdrawn through conduit 24, heated in a conventional reboiler 26 and returned to prefractionator 23 through conduit 24. Heat is supplied to reboiler 26 by steam which enters through conduit 27 and leaves through conduit 28. A bottom fraction having the composition shown in Table III is withdrawn from prefractionator 23 through conduit 29 at the rate of 28,950 pounds per hour. The liquid in conduit 29 is cooled to a temperature of 100° F. in a cooler 32 and is withdrawn from the system through conduit 29 and a valve 31. The product withdrawn through conduit 29 may be treated for recovery of one or more of its components, if desired.

TABLE III

Composition of bottoms from prefractionator 23

| | lb./hr. |
|---|---|
| $C_2$ hydrocarbons | 30 |
| $C_3$ hydrocarbons | 12,595 |
| $C_4$ hydrocarbons | 13,095 |
| $C_5$ hydrocarbons | 2,840 |
| $C_6$ and heavier hydrocarbons | 390 |
| Total | 28,950 |

Overhead is withdrawn from fractionator 23 through conduit 33 and passed through a reflux condenser 34 to a separation drum 36 which is maintained at a temperature of 70° F. and a pressure of 530 p.s.i.g. In reflux condenser 34, the overhead in conduit 33 is cooled by indirect contact with 60° F. propane which enters through conduit 37 and leaves through conduit 38. Liquid is withdrawn from separation drum 36 at the rate of 22,558 pounds per hour through conduit 39 and is returned to prefractionator 23 via a pump 41. The liquid thus returned to prefractionator 23 serves as reflux to the prefractionator. Vapors from separation drum 36 are withdrawn through conduit 42 and passed to conduit 19 to be further treated as described below.

Feed entering through conduit 12 passes through a valve 43 to a separation drum 44 at the rate of 121,096 pounds per hour. Separation drum 44 is maintained at a temperature of 70° F. and a pressure of 530 p.s.i.g. Water separated in separation drum 44 is withdrawn through conduit 46 and a valve 47 at the rate of 96 pounds per hour. Overhead vapors from separation drum 44 are withdrawn through conduit 48 at the rate of 94,934 pounds per hour and are passed through conduit 48 to conduit 19 to be further treated as described below.

Liquid from separation drum 44 is withdrawn through conduit 49 at the rate of 26,066 pounds per hour and passed via a pump 51 to a prefractionator 52 which is a conventional distillation tower. Prefractionator 52 is maintained at a bottom pressure of 535 p.s.i.g., a top temperature of 110° F. and a bottom temperature of 250° F. Liquid from the lower portion of prefractionator 52 is withdrawn through conduit 53, heated in a conventional reboiler 54 by indirect contact with steam and returned to prefractionator 52 through conduit 53. Steam for reboiler 54 enters through conduit 56 and leaves through conduit 57. A bottoms fraction having the composition shown in Table IV is withdrawn from prefractionator 52 through 58 at the rate of 19,996 pounds per hour and is passed through a valve 59 to a depropanizer 60 to be further treated as described below. Overhead from prefractionator 52 is withdrawn through conduit 62 at the rate of 22,564 pounds per hour. Overhead in conduit 62 is cooled and partially condensed in a reflux condenser 63 and then passed to a separation drum 64 which is maintained at a temperature of 70° F. and a pressure of 530 p.s.i.g. In reflux condenser 63, the overhead in conduit 62 is cooled by indirect contact with 60° F. propane which enters through conduit 66 and leaves through conduit 67. Liquid from separation drum 64 is withdrawn through conduit 68 at the rate of 16,490 pounds per hour and passed via a pump 69 to prefractionator 52 as reflux thereto. Vapors from separation drum 64 are withdrawn through conduit 71 and passed through conduit 48 to conduit 19. The vapors withdrawn through conduit 71 have the composition shown in Table V.

TABLE IV

Composition of bottoms from prefractionator 52

| Component: | lb./hr. |
|---|---|
| $C_2$ hydrocarbons | 12 |
| $C_3$ hydrocarbons | 9,047 |
| $C_4$ hydrocarbons | 7,732 |
| $C_5$ hydrocarbons | 2,265 |
| $C_6$ and heavier hydrocarbons | 940 |
| Total | 19,996 |

TABLE V

Composition of vapor from separation drum 64

| Component: | lb./hr. |
|---|---|
| Inerts | 81 |
| $H_2$ | 11 |
| $C_1$ hydrocarbons | 576 |
| $C_2$ hydrocarbons | 3,833 |
| $C_3$ hydrocarbons | 1,523 |
| $C_4$ hydrocarbons | 46 |
| Total | 6,070 |

Vapors in conduit 19 are passed through a valve 73 to a dryer 74 containing a bed of desiccant which removes moisture from the gaseous stream. From dryer 74 the dried hydrocarbons pass through conduit 77 and a valve 78 to be further treated as described below. The composition of the treated hydrocarbons passing from dryer 76 through conduit 77 is shown in Table VI.

TABLE VI

Composition of dried hydrocarbons in conduit 77

| Component: | lb./hr. |
|---|---|
| Inerts | 12,113 |
| $H_2$ | 1,940 |
| $C_1$ hydrocarbons | 20,880 |
| $C_2$ hydrocarbons | 42,317 |
| $C_3$ hydrocarbons | 34,843 |
| $C_4$ hydrocarbons | 10,769 |
| $C_5$ hydrocarbons | 1,262 |
| $C_6$ and heavier hydrocarbons | 250 |
| Total | 124,374 |

The desiccant used in dryer 76 in this particular instance is activated alumina but any suitable desiccant may, of course, be used. Since the desiccant material is limited as to the quantity of water it can remove from the hydrocarbon stream, a second dryer 79 is provided so that while one dryer is being used to remove water from the hydrocarbon stream, the other dryer may be regenerated by passing hot gases through to remove moisture therefrom. Dryer 79 is similar in all respects to dryer 76. While the hydrocarbon stream from conduit 19 is passing through dryer 76, dryer 79 which has previously been used to remove water from the hydrocarbon stream is being regenerated by hot flue gas which enters through conduit 81 at a temperature of 400° F. The hot flue gas from conduit 81 passes through a valve 82 and conduit 83 to dryer 79. In dryer 79 the hot flue gas absorbs the water from the desiccant thereby drying the desiccant and leaving it ready to absorb more water from the hydrocarbon stream. Moist flue gas passes from dryer 79 through conduit 84, conduit 85, valve 86 and conduit 88 at a temperature of 170 to 400° F. depending on the extent of which regeneration has progressed. The moist flue gas from conduit 88 may then be cooled to condense absorbed moisture and the treated gas may be reheated for further use in removing water from the desiccant material in the dryers. When it becomes necessary to regenerate dryer 74 the hydrocarbon stream from conduit 19 passes through conduit 84 and a valve 91 to dryer 79 while the hot flue gas is admitted to dryer 76 through conduit 81, a valve 89 and conduit 77. During this portion of the drying cycle, dried hydrocarbon stream passes from dryer 79 through conduit 83 and valve 92 to conduit 77 while the moist flue gas passes from dryer 74 through conduit 19, conduit 88 and a valve 93.

The hydrocarbon stream in conduit 77 passes through a heat exchanger 101 in which its temperature is reduced to 50° F. by indirect contact with ethane at a temperature of −55° F. Ethane enters exchanger 101 through conduit 102 and leaves through conduit 103. From exchanger 101 the hydrocarbon stream in conduit 77 passes to a heat exchanger 104 in which its temperature is reduced to 25° F. by indirect contact with propane at a temperature of 12° F. Propane enters heat exchanger 104 through conduit 106 and leaves through conduit 107. From heat exchanger 104, the hydrocarbon stream in conduit 77 passes to a heat exchanger 108 in which its temperature is reduced to 10° F. by indirect contact with propane at a temperature of 0° F. Propane enters heat exchanger 108 through conduit 109 and leaves through conduit 111. From heat exchanger 108, the hydrocarbon stream in conduit 77 passes to a heat exchanger 112 in which its temperature is reduced to −10° F. by indirect contact with propane at −20° F. Propane enters heat exchanger 112 through conduit 113 and leaves through conduit 114. From heat exchanger 112, the hydrocarbon stream in conduit 77 passes to a heat exchanger 116 in which its temperature is reduced to −20° F. by indirect contact with propane at a temperature of −34° F. Propane enters heat exchanger 116 through conduit 117 and leaves through conduit 118. From heat exchanger 116 the hydrocarbon stream in conduit 77 passes to a heat exchanger 119 in which its temperature is reduced to −56° F. by indirect contact with ethane at a temperature of −59° F. Ethane enters heat exchanger 119 through conduit 121 and leaves through conduit 122. From heat exchanger 119 the hydrocarbon stream in conduit 77 passes to a heat exchanger 123 in which its temperature is reduced to −56° F. by indirect contact with ethylene at a temperature of −91° F. Ethylene enters heat exchanger 123 through conduit 124 and leaves through conduit 126.

From heat exchanger 123, the hydrocarbon stream in conduit 77 passes to a primary demethanizer 127. Primary demethanizer 127 is a conventional distillation column containing bubble trays and is maintained at a bottom pressure of 495 p.s.i.g. Overhead vapors having the composition shown in Table VIII are withdrawn from primary demethanizer 127 through conduit 129 at a temperature of −105° F. and at the rate of 60,594 pounds per hour. The overhead in conduit 129 is cooled to a temperature of −145° F. and partially condensed by a heat exchanger 131 in which the overhead in conduit 129 is cooled by indirect contact with ethylene at a temperature of −150° F. Ethylene enters heat exchanger 131 through conduit 132 and leaves through conduit 133. From heat exchanger 133 the cooled and partially condensed overhead continues through conduit 129 into a separation drum 134 which is maintained at a pressure of 485 p.s.i.g. Liquid which accumulates in separation drum 134, is returned through conduit 136 to the upper portion of primary demethanizer 127 as reflux thereto at the rate of 17,012 pounds per hour.

Vapor from separation drum 134 is withdrawn through conduit 137 at the rate of 43,582 pounds per hour. A portion of the vapor in conduit 137 is cooled and partially condensed in a heat exchanger 138. The remaining vapor in conduit 137 passes through conduit 152, is cooled and partially condensed in a heat exchanger 153 and then continues through conduit 152 to rejoin the material in conduit 137. Material in conduit 137 then passes to a separation drum 139 which is maintained at a temperature of −173° F. and a pressure of 485 p.s.i.g. Liquid which accumulates in separation drum 139 is withdrawn through conduit 141. A portion of the liquid in conduit 141 is passed through conduit 142 as reflux to primary demethanizer 127. The remaining liquid in conduit 141 continues through an expansion valve 143. As a result of its passage through expansion valve 143, the temperature of the liquid in conduit 141 is lowered to −215° F. and its pressure is lowered to 85 p.s.i.g. From expansion valve 143, the liquid in conduit 141 passes to conduit 144 to be further treated as described below.

Vapor from separation drum 139 is withdrawn through conduit 147 and passed to an expansion valve 146 at the rate of 36,836 pounds per hour. In expansion valve 146, the vapor is isenthalpically expanded and is then passed through conduit 147 to a separation drum 148 which is maintained at a temperature of −218° F. and a pressure of 85 p.s.i.g. If desired, turbo-expanders or other types of expansion engines may be used in place of expansion valves 143 and 146. Vapors are withdrawn from separation drum 148 through conduit 149 and passed through heat exchanger 138 where they are warmed to a temperature of −152° F. by indirect contact with fluid in conduit 137 as described above. From heat exchanger 138 the vapor in conduit 149 passes from the system through a valve 151 as tail gas product at the rate of 34,070 pounds per hour. The tail gas product has the composition shown in Table VII. If desired, the cold tail gas recovered in this way may be used to supply cooling duty in any convenient manner.

TABLE VII

*Composition of tail gas product*

| Component: | Lb./hr. |
|---|---|
| Inerts | 12,065 |
| $H_2$ | 1,940 |
| $C_1$ hydrocarbons | 19,673 |
| $C_2$ hydrocarbons | 392 |
| Total | 34,070 |

Liquid which accumulates in separation drum 148 as a result of the expansion and consequent cooling of fluid in conduit 146 is withdrawn through conduit 154 and a valve 156 and passes into conduit 144 at the rate of 3,023 pounds per hour. The fluid in conduit 144 passes through heat exchanger 153 where its temperature is raised to 171° F. by indirect contact with the material in conduit 152, as described above. From heat exchanger 153 the fluid in conduit 144 passes to a heat exchanger 157 where it is warmed to a temperature of −80° F. by indirect contact with ethylene which enters heat exchanger 157 through conduit 158 at a temperature of −49° F. and leaves through conduit 159 at a temperature of 91° F. From heat exchanger 157 the fluid in conduit 144 passes through a heat exchanger 161 where it is warmed to a temperature of −50° by indirect contact with material in conduit 163 as described below. From heat exchanger 161 the fluid in conduit 144 continues to a compressor 162 where it is compressed to a pressure of 530 p.s.i.g. Compressed fluid from compressor 162 passes through conduit 163 at a temperature of 150° F. to a heat exchanger 164 where its temperatures is reduced to 100° F. From heat exchanger 164, the material in conduit 163 passes through heat exchanger 161 where its temperature is reduced to 70° F. by indirect contact with the material in conduit 144 as described above. From heat exchanger 161, the material in conduit 163 is recycled to conduit 11 where it forms part of the feed to the process. The composition of the demethanizer recycle in conduit 163 is shown in Table VIII.

TABLE VIII

*Composition of demethanizer recycle fluid in conduit 163*

| Component: | Lb./hr. |
|---|---|
| Inerts | 48 |
| $C_1$ hydrocarbons | 1,170 |
| $C_2$ hydrocarbons | 1,805 |
| Total | 3,023 |

Liquid bottoms are removed from primary demethanizer 127 through conduit 164 at a temperature of −21° F. and at the rate of 124,960 pounds per hour. The liquid in conduit 164 is passed via a pump 166 to a secondary demethanizer 167 which is a conventional distillation tower. Secondary demethanizer 167 is maintained at a bottom pressure of 495 p.s.i.g. Overhead vapors are withdrawn from secondary demethanizer 167 through conduit 168 at a temperature of −19° F. and at the rate of 38,600 pounds per hour. The vapors in conduit 168 are introduced into the lower portion of primary demethanizer 127 and serve to reboil the primary demethanizer. It can be seen that the use of primary and secondary demethanizers is purely a matter of convenience and that it would be entirely feasible to combine both demethanizers into a single distillation tower. Likewise, it would be entirely feasible to construct separation drums 134 and 139 entirely separate from primary demethanizer 128. The particular arrangement of the various towers and drums as shown is arrived at purely on the basis of convenience and economy in construction and operation.

Liquid from an intermittent point in secondary demethanizer 167 is withdrawn through conduit 169, heated and partially vaporized by indirect contact with condensing propane in a heat exchanger 171 and returned to secondary demethanizer 167 through conduit 169. The material in conduit 169 is heated from a temperature of 22° F. to a temperature of 33° F. during its passage through heat exchanger 171. Propane enters heat exchanger 171 through conduit 172 and leaves through conduit 173. Liquid from the lower portion of secondary demethanizer 167 is withdrawn through conduit 174 at a temperature of 60° F., partially vaporized and heated to a temperature of 72° F. in a conventional reboiler 176 and then returned to secondary demethanizer 167 through conduit 174. Reboiling heat is supplied in reboiler 176 by indirect contact with condensing propane at a temperature of 85° F. Propane enters reboiler 176 through conduit 177 and leaves through conduit 178. A bottoms fraction having the composition shown in Table IX is withdrawn from secondary demethanizer 167 through conduit 179 at a temperature of 72° F. and at the rate of 87,281 pounds per hour. Material in conduit 179 passes through a pressure reducing valve 181 and enters a de-ethanizer 182. De-ethanizer 182 is a conventional distillation column having a bottom pressure of 385 p.s.i.g. A vaporized overhead fraction is withdrawn from de-ethanizer 182 through conduit 183 at a temperature of 40° F. and at the rate of 135,636 pounds per hour. The overhead fraction in conduit 183 is cooled and partially condensed in a reflux condenser 184 by indirect contact with propane at a temperature of 12° F. Propane enters reflux condenser 184 through conduit 186 and leaves through conduit 187. From reflux condenser 184, the overhead in conduit 183 passes to a separation drum 188 which is maintained at a pressure of 75 p.s.i.g. and a temperature of 30° F. Liquid separated in separation drum 188 is withdrawn through conduit 189 and passed by a pump 191 to de-ethanizer 182 at the rate of 93,725 pounds per hour as reflux. Vapor from separation drum 188 is withdrawn through conduit 192 and passed from the system through a valve 193 as $C_2$ product at the rate of 41,665 pounds per hour. The composition of the $C_2$ product is shown in Table X.

TABLE IX

*Composition of bottoms withdrawn from secondary demethanizer 167*

| Component: | Lb./hr. |
|---|---|
| $C_1$ hydrocarbons | 37 |
| $C_2$ hydrocarbons | 40,120 |
| $C_3$ hydrocarbons | 34,843 |
| $C_4$ hydrocarbons | 10,769 |
| $C_5$ hydrocarbons | 1,262 |
| $C_6$ and heavier hydrocarbons | 250 |
| Total | 87,281 |

TABLE X

*Composition of $C_2$ product*

| Component: | Lb./hr. |
|---|---|
| $C_1$ hydrocarbons | 37 |
| $C_2$ hydrocarbons | 40,053 |
| $C_3$ hydrocarbons | 1,575 |
| Total | 41,665 |

Liquid from the lower portion of de-ethanizer 182 is withdrawn through conduit 194, heated and partially vaporized in a conventional reboiler 196 and returned to de-ethanizer 182 through conduit 194. In reboiler 196 the material in conduit 194 is heated from a temperature of 163° F. to a temperature of 168° F. by indirect contact with steam which enters reboiler 196 through conduit 197 and leaves through conduit 198. A bottoms fraction having the composition shown in Table XI is withdrawn from de-ethanizer 182 through conduit 199 at the rate of 45,616 pounds per hour and at a temperature of 160° F. The bottoms fraction in conduit 199 passes to depropanizer 60 via a valve 201, conduit 58 and valve 59. It is also possible, if desired, to recover the bottoms fraction in conduit 199 as a product of the process by passing it through conduit 202 and a valve 203. This might be done any time it might become either unnecessary or undesirable to send this material to depropanizer 60. In the particular embodiment of this invention which is further illustrated below, valve 203 is closed and valve 201 is open so that the material in conduit 199 passes to depropanizer 60.

TABLE XI

*Composition of bottoms withdrawn from de-ethanizer 182*

| Component: | Lb./hr. |
|---|---|
| $C_2$ hydrocarbons | 67 |
| $C_3$ hydrocarbons | 33,268 |
| $C_4$ hydrocarbons | 10,769 |
| $C_5$ hydrocarbons | 1,262 |
| $C_6$ and heavier hydrocarbons | 250 |
| Total | 45,616 |

An overhead fraction is withdrawn from depropanizer 60 through conduit 204 at a temperature of 110° F. and at the rate of 137,596 pounds per hour. The overhead in conduit 204 is condensed in reflux condenser 206 and then passes to a settling drum 207 which is maintained at a pressure of 215 p.s.i.g. and a temperature of 110° F. Liquid from settling drum 207 is withdrawn through conduit 208. A portion of the liquid in conduit 208 is returned to depropanizer 60 by a pump 209 at the rate of 95,133 pounds per hour as reflux. The remaining 42,463 pounds per hour of liquid from conduit 208 is passed through conduit 211 and a valve 212 to a pump 213. From pump 213 the liquid passes from the system through conduit 211 and a valve 214 as $C_3$ product. The composition of the $C_3$ product withdrawn through conduit 211 is shown in Table XII.

TABLE XII

*Composition of $C_3$ product*

| Component: | Lb./hr. |
|---|---|
| $C_2$ hydrocarbons | 79 |
| $C_3$ hydrocarbons | 42,129 |
| $C_4$ hydrocarbons | 255 |
| Total | 42,463 |

Liquid from the lower portion of depropanizer 60 is withdrawn through conduit 216, heated and partially vaporized in a conventional reboiler 218 and returned to depropanizer 16 through conduit 216. Heat for reboiler 218 is supplied with steam which enters through conduit 220 and leaves through conduit 222. A bottoms fraction having the composition shown in Table XIII is withdrawn from depropanizer 60 through conduit 205 at a temperature of 210° F. and at the rate of 23,149 pounds per hour. The bottoms fraction withdrawn through conduit 205 is passed from the system through a valve 223 as a product of the process and comprises primarily $C_4$ and $C_5$ hydrocarbons.

TABLE XIII

*Composition of $C_4$–$C_5$ product*

| Component: | Lb./hr. |
|---|---|
| $C_3$ hydrocarbons | 186 |
| $C_4$ hydrocarbons | 18,246 |
| $C_5$ hydrocarbons | 3,527 |
| $C_6$ and heavier hydrocarbons | 1,190 |
| Total | 23,149 |

The arrangement of apparatus and process conditions described above are merely one example of the usefulness of this invention. It will be obvious to those skilled in the art that numerous other arrangements of apparatus and different process conditions may be used without departing from the scope of this invention.

We claim:

1. The method for separating hydrocarbons which comprises passing a hydrocarbon mixture containing $C_2$, $C_3$ and $C_4$ hydrocarbons to a first distillation zone, in said first distillation zone fractionating said mixture to produce an overhead fraction comprising $C_2$, $C_3$ and $C_4$ hydrocarbons and a bottoms fraction comprising $C_3$ and $C_4$ hydrocarbons, withdrawing overhead fraction from said first distillation zone and separating $C_2$ hydrocarbons therefrom, passing the overhead fraction withdrawn from said first distillation zone and free of $C_2$ hydrocarbons to a second distillation zone, withdrawing bottoms fraction from said first distillation zone and passing said withdrawn bottoms fraction to said second distillation zone, in said second distillation zone fractionating said overhead and bottoms fractions of said first distillation zone to produce in said second distillation zone an overhead fraction comprising $C_3$ hydrocarbons and a bottoms fraction comprising $C_4$ hydrocarbons, and withdrawing thus formed overhead and bottoms fractions from said second distillation zone.

2. The method for separating hydrocarbons which comprises passing a hydrocarbon mixture containing $C_1$, $C_2$, $C_3$, $C_4$ and $C_5$ hydrocarbons to a first distillation zone, in said first distillation zone fractionating said mixture to produce an overhead fraction comprising $C_1$, $C_2$, $C_3$ and $C_4$ hydrocarbons and a bottoms fraction comprising $C_3$, $C_4$ and $C_5$ hydrocarbons, withdrawing overhead fraction from said first distillation zone and separating $C_1$ and $C_2$ hydrocarbons therefrom, passing the overhead fraction withdrawn from said first distillation zone and free of $C_1$ and $C_2$ hydrocarbons to a second distillation zone, withdrawing bottoms fraction from said first distillation zone and passing said withdrawn bottoms fraction to said second distillation zone, in said second distillation zone fractionating said overhead and bottoms fractions of said first distillation zone to produce in said second distillation zone an overhead fraction comprising $C_3$ hydrocarbons and a bottoms fraction comprising $C_4$ and $C_5$ hydrocarbons, and withdrawing thus-formed overhead and bottoms fractions from said second distillation zone.

3. The process according to claim 2 in which the overhead fraction withdrawn from the first distillation zone, following separation of $C_1$ and $C_2$ hydrocarbons, comprises more than about 5 weight per cent $C_4$ and heavier hydrocarbons.

4. The process according to claim 2 in which the overhead fraction withdrawn from the first distillation zone, following separation of $C_1$ and $C_2$ hydrocarbons, comprises less than about 5 weight per cent $C_4$ and heavier hydrocarbons.

References Cited in the file of this patent

UNITED STATES PATENTS

| 2,571,329 | Berg | Oct. 16, 1951 |
| 2,577,617 | Hudig | Dec. 4, 1951 |
| 2,645,104 | Kniel | July 14, 1953 |
| 2,705,698 | Hamner | Apr. 5, 1955 |
| 2,743,590 | Grunberg | May 1, 1956 |
| 2,744,394 | Newton | May 8, 1956 |
| 2,769,321 | Stiles | Nov. 6, 1956 |
| 2,794,334 | Peaslee et al. | June 4, 1957 |